United States Patent [19]
Rossman et al.

[11] Patent Number: 5,277,392
[45] Date of Patent: Jan. 11, 1994

[54] ADJUSTABLE COMPUTER MONITOR ARM AND METHOD

[75] Inventors: Jon Rossman, Chelmsford, Mass.; Edward L. Hames, Peterborough, N.H.

[73] Assignee: Curtis Manufacturing Company, Inc., Jaffrey, N.H.

[21] Appl. No.: 963,118

[22] Filed: Oct. 19, 1992

[51] Int. Cl.$^5$ .............................................. E04G 3/00
[52] U.S. Cl. .................. 248/231.7; 248/919; 248/920
[58] Field of Search .............. 248/231.7, 283, 917–922

[56] References Cited

U.S. PATENT DOCUMENTS

| | | | |
|---|---|---|---|
| D. 325,868 | 5/1992 | Bartok . | |
| 4,516,751 | 5/1985 | Westbrook | 248/920 |
| 4,562,987 | 1/1986 | Leeds et al. | 248/920 |
| 4,687,167 | 8/1987 | Shalka et al. | 248/919 |
| 4,708,312 | 11/1987 | Rohr | 248/919 |

OTHER PUBLICATIONS

Curtis Manufacturing Company, Inc.'s 1991 Product Brochure—Published in Jaffrey, N.H.

*Primary Examiner*—Douglas D. Watts
*Attorney, Agent, or Firm*—Richard P. Crowley

[57] ABSTRACT

An adjustable monitor support apparatus to support a monitor in a viewing position, which apparatus includes a generally vertical base with a shaft, shaft bushing and outer sleeve; a monitor arm secured at the one end to the shaft housing for rotation about the shaft, and having a generally horizontal monitor support platform at the other end of the monitor arm. The monitor support platform is rotatable between locked and release positions at the other end of the monitor arm and optionally also may be tilted to a selected angular position. The monitor support apparatus is secured to a surface, such as a table top, by a threaded clamp assembly on a mounting bracket. The monitor support apparatus includes a plurality of removable, generally uniform spacer elements within the sleeve and adjacent the shaft. The one end of the monitor arm is adjusted to a selected, vertical height by the user positioning and arranging the spacer elements in a vertically stacked, aligned, interlocking arrangement beneath the shaft bushing. The monitor support apparatus optionally may include a keyboard support slidably mounted for movement between a compact, non-use position beneath the support platform and an outwardly-extended use position, to support a keyboard beneath the supported monitor.

25 Claims, 5 Drawing Sheets

ADJUSTABLE COMPUTER MONITOR ARM AND METHOD

BACKGROUND OF THE INVENTION

There are a wide variety of monitor supports which are designed to be secured to a table or desk top and to support a computer or other video screen monitor in a proper viewing position by a user, often such monitor support apparatus also have a keyboard support, associated with the monitor support, to provide support for a keyboard used with the monitor generally in front of and beneath the supported monitor screen.

It is desirable to provide a monitor, and optionally a monitor and keyboard support apparatus, which may be adjusted; particularly, easily adjusted by the user to provide for the correct vertical height of the monitor and keyboard for the user.

SUMMARY OF THE INVENTION

The invention relates to an adjustable monitor support apparatus and method of supporting and adjusting a monitor to a desired viewing position. In particular, the monitor support apparatus provides the user an easy and effective means to adjust the vertical height of the monitor support platform.

The invention concerns an adjustable monitor, and optionally a keyboard support apparatus, for the adjustable positioning of a monitor having a monitor screen, and optionally a keyboard, which apparatus comprises a generally vertical base means having a one and another end which comprises a generally vertical shaft bushing about the base shaft, and an outer sleeve about the shaft and shaft bushing; and, for example, a generally horizontal, elongated angular monitor arm of diecast aluminum having a one end and another end, the one end of the monitor arm secured to the shaft bushing for rotation of the monitor arm about the shaft. The apparatus includes a monitor support platform adapted to support a monitor on the generally horizontal top surface of the monitor support platform, the other end of the monitor arm secured to the bottom surface of the monitor support platform; and a means, such as an upright shaft, centrally located, to provide for the axial rotation of the monitor support platform at the other end of the monitor arm in a generally horizontal plane; and means, such as an adjustable handle, on a shaft below the platform to secure the monitor support platform in a selected locked position in a generally horizontal plane after rotation to the selected position; means, such as a clamp assembly, to secure the one end of the base means to a surface, above which surface a monitor is to be positioned. The apparatus also includes spacer means, typically a plurality of spacers, such as selected incremental, removable, arrangeable, individual spacers within the sleeve, to permit the vertical adjustment of the height of the one end of the monitor arm on the shaft bushing by the user selection of the arrangement of the spacers within the sleeve, so as to provide for the desired corresponding height of the monitor support platform at the other end of the monitor arm.

The apparatus may optionally include means to tilt slidably the monitor support platform to adjust the angular position of the monitor on the monitor support platform, such as by an elongated slot generally centrally disposed in the monitor support platform, a threaded shaft extending through the said slot, and a lock nut threadably connected to the said shaft, the monitor support platform slidable along the slot and fixed in position by the lock nut.

The apparatus may also optionally include a keyboard support means to support a keyboard in front of the monitor, which keyboard support is slidably mounted between the monitor support platform and moves between a stored non-use position and a generally horizontal outwardly-extending use position from the monitor support arm. For example, a generally U-shaped wire, slidably mounted beneath the monitor support platform and having a short, upwardly extending front to retain the keyboard in position and stop means to prevent the entire slidable withdrawal of the wire in use.

The method provides for the proper, rapid and easy positioning of a monitor on a monitor support apparatus which comprises a generally vertical base, a monitor support arm having a one and other end generally horizontally extending at the one end from the base, and a monitor support platform at the other end of the base, and a monitor on the monitor support platform. The method comprises securing the monitor support apparatus to a surface; rotating the monitor arm to a desired monitor viewing position; rotating and securing the monitor support platform to a desired monitor viewing position; and vertically adjusting by selected space increments the height of the one end of the monitor arm about the shaft to adjust the vertical height of the monitor support platform and monitor.

The monitor support apparatus of the invention includes means to provide for the simple and easy adjustment by the user of the vertical height of the support platform at the other end of the monitor arm, so that a correct viewing position of the monitor is easily obtained. In one embodiment, the vertical height of the one end of the monitor arm extending outwardly from the base means is adjusted by the arrangement in the base means of individual separate spacer elements. The spacer elements may be of the same or varied height, but generally are of uniform height, so that each movement of spacer elements represents a uniform change in vertical height; for example, spacer elements may be in $\frac{1}{4}$, $\frac{1}{2}$, $\frac{3}{4}$ or 1 or more inch increments, or combinations thereof.

The spacer elements in one preferred embodiment are designed to be stacked together vertically in an interlocking, mating relationship from a base, which base contains a static raised ridge to interlock with the elongated opening on the bottom of the first spacer element. Each of the spacer elements have a receiving slot or opening on the one, for example, bottom surface and a raised ridge on the other, for example, the top surface matingly receivable in the slot or opening of the next stacked spacer element, so that the selected stacked spacer elements are interlocked together to provide the proper support beneath the shaft bushing and interlocked together above the shaft bushing for storage and design purposes.

Generally, the monitor arm is composed of a lightweight metal material, such as diecast metal like aluminum or an aluminum alloy, and generally the spacer elements are of the same or similar material. The spacer elements comprise a plurality of spacer elements in a vertically stacked arrangement either above or below or both above and below the shaft bushing from which extends the monitor arm, so that the position of the rotatable shaft bushing and the one end of the monitor arm on the vertical shaft of the base means may be adjusted. The spacer elements have a one arcuate surface end, which is a concave surface which closely fits and mimics the shaft diameter, and an outer other surface to be grasped or handled by the user, generally with a friction-type, corrugated or roughened surface. The spacer elements are positioned within a vertical slot in the outer sleeve about the shaft and shaft bushing and from which slot the monitor arm extends outwardly. The sleeve has a top cap f or enclosing the top of the shaft and sleeve and to secure the interlocked spacer elements on the base of the monitor arm. The number of spacer elements may vary as desired, but generally would use from about 6 to 12 spacer elements, said elements ½ of an inch in height, which permits a height adjustment of 3 to 6 inches. The spacer elements contained above the shaft bushing do not provide height adjustment, but represent an inventory for other adjustments and fill the slot for design purposes.

The monitor arm extends generally horizontally outward, but typically at an upward angle of, for example, 5 to 30 degrees, such as 10 to 15 degrees, and has a length which may vary, but generally is from about 18 to 30 inches in length. The monitor arm has a monitor support platform at the other end, typically of a hard, plastic material and which includes means to rotate or pivot the platform in a horizontal plane about a central shaft.

In one embodiment, the platform has a centrally positioned, contoured, depressed, circular area with an elongated arcuate straight slot therein so that the rotatable platform also may be slightly tilted from the horizontal plane, e.g., about 2 to 15 degrees, so as to tilt the supported monitor from the horizontal plane to a better viewing position. A shaft extends through the elongated slot and has an adjustable knob at the lower end below the platform, so that after rotation and tilting the platform can be locked in a position by tightening the knob, while the upper end of the shaft includes a captive nut or screw extending greater than the slot width and a lock nut at the end of this shaft, so that the adjusting knob on the threaded lower end of the shaft may be threadably tightened to place the platform in a locked position.

The monitor support apparatus includes means to secure the apparatus to a surface, such as a desk top; such as, but not limited to, bolts, screws, or by a threaded removable adjustable clamp assembly on a mounting bracket from which the base means extends.

Preferably, the monitor support apparatus includes a keyboard support to support a keyboard in front of the supported monitor, such as a wire frame, slidably mounted for movement by the user between a non-use stored position beneath the platform and an outward-extending use position in front of the platform.

The invention will be described for the purposes of illustration only in connection with certain illustrated embodiments; however, it is recognized that various changes, modifications, improvements and additions may be made by those persons skilled in the art all falling within the spirit and scope of this invention.

DESCRIPTION OF THE EMBODIMENTS

Figure 7:
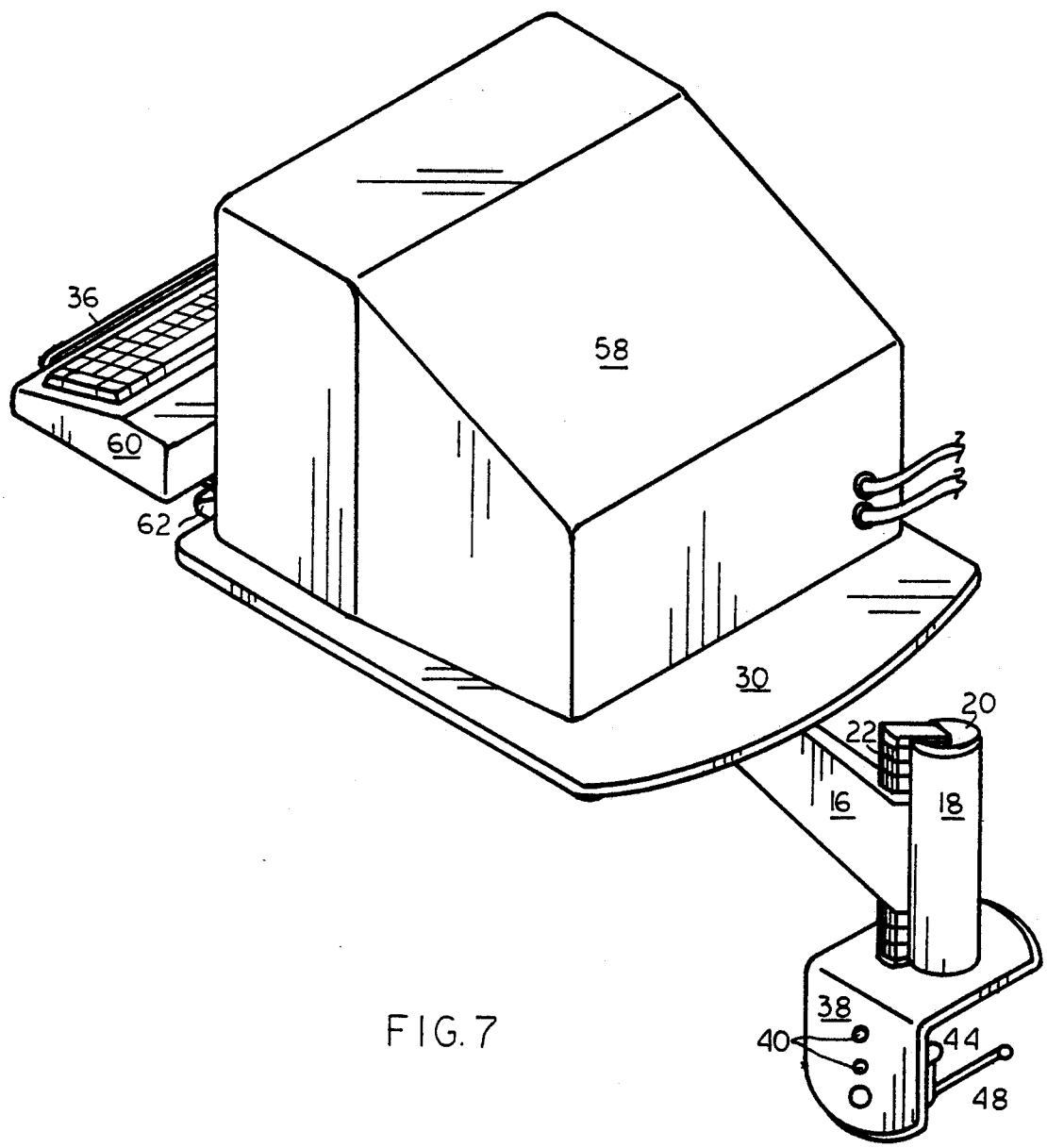
FIG. 7 is a perspective view from above of the apparatus of FIG. 1 with a supported monitor and supported keyboard.

With reference to the drawings, there is shown an adjustable monitor support apparatus 10 with a computer monitor 58 with a video screen supported in a viewing position and with a keyboard 60 supported by a keyboard support 36 in an extended use position beneath the monitor 58 (see FIG. 7). The apparatus 10 includes a generally vertical fixed shaft 12, with a shaft bushing 14 and a horizontally extended, upwardly-angled, diecast aluminum monitor arm 16 secured to the shaft bushing 14 at the one end for axial rotation of the monitor arm about the shaft 12. The apparatus 10 includes an outer sleeve 18 about the shaft 12 and shaft bushing 14 with an elongated slot 28 in the vertically extended sleeve 18, through which slot 28 extends monitor arm 16. A solid cap 20 is fitted on top of the sleeve 18 and covers the shaft and shaft bushing and a plurality of vertically stacked spacer elements 22.

A plurality of individual, removable, diecast aluminum, uniform width, ½" high, with slightly tapered sides, spacer elements 22 (see FIGS. 5 and 6) are vertically stacked within the sleeve 18 and extend outwardly from the slot 28. As illustrated, three spacer elements 22 are stacked beneath and support the shaft bushing 14 with three spacer elements 22 stored above the shaft bushing 14 and beneath cap 20. Each of the spacer elements 22 have an arcuate concave surface 24 at the one end which mimics the diameter of the shaft 12 and fits adjacent the shaft 12 surface, while the other end of the spacer elements 22 have a plurality of generally vertical corrugations 26 for ease in the removing, replacing and arranging the spacer elements 22 in position adjacent to the shaft 12 and within sleeve 18. The spacer elements 22 are selected by the user to provide the desired vertical height of the one end of the monitor arm 16 on the shaft 12 which then adjusts the height of the other end of the monitor arm 16, which contains a monitor support platform 30, and adjusts the vertical height of the supported monitor 58 and the supported keyboard 60.

The upper section of the monitor arm 16 includes an elongated slot or opening 74 to receive in an interlocked mating arrangement the raised ridge 76 of the adjacent lower spacer element 22 to lock the shaft bushing 14 into place with the vertical stacked supporting spacer elements 22. The top section of the monitor arm 16 includes an elongated slot or opening 78 which is adapted to fit in an interlocked mating arrangement with a raised edge 80 on the bottom of the first spacer element 22 on top of the shaft bushing 14. The shaft bushing 14 is interlocked above and below with the interlocked vertical stack of spacer elements 22 on the base and is surrounded by the sleeve 18 and has a top cap 20 to provide a secure, interlocked, supported, rotatable shaft locking within the sleeve 18. Of course, the position of the raised ridges and elongated openings may be reversed to provide the same or similar interlocked structure, starting from the base 34 upwardly.

Figure 1:
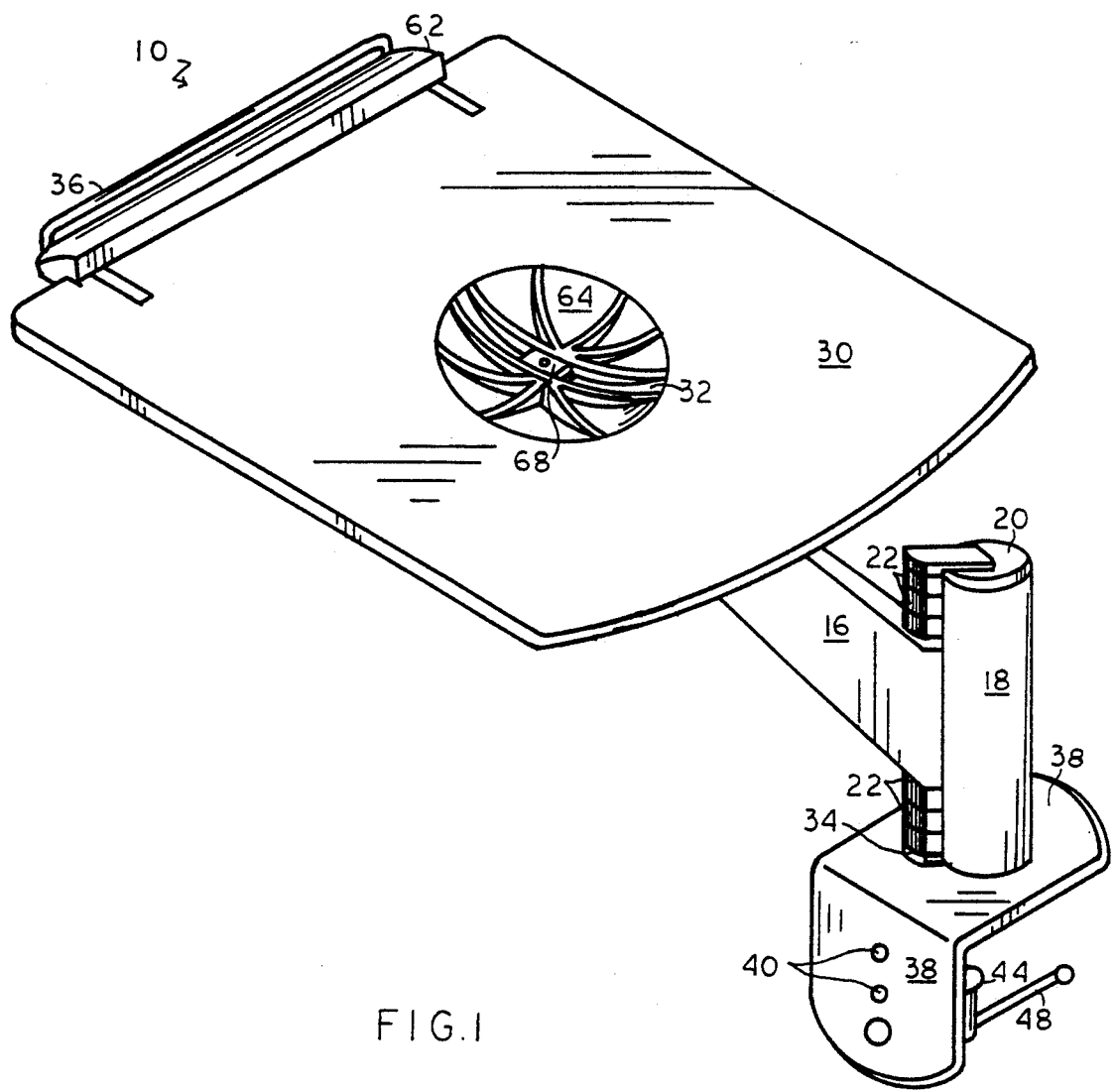
FIG. 1 is a perspective view from above of the monitor support apparatus of the invention.
Figure 2:
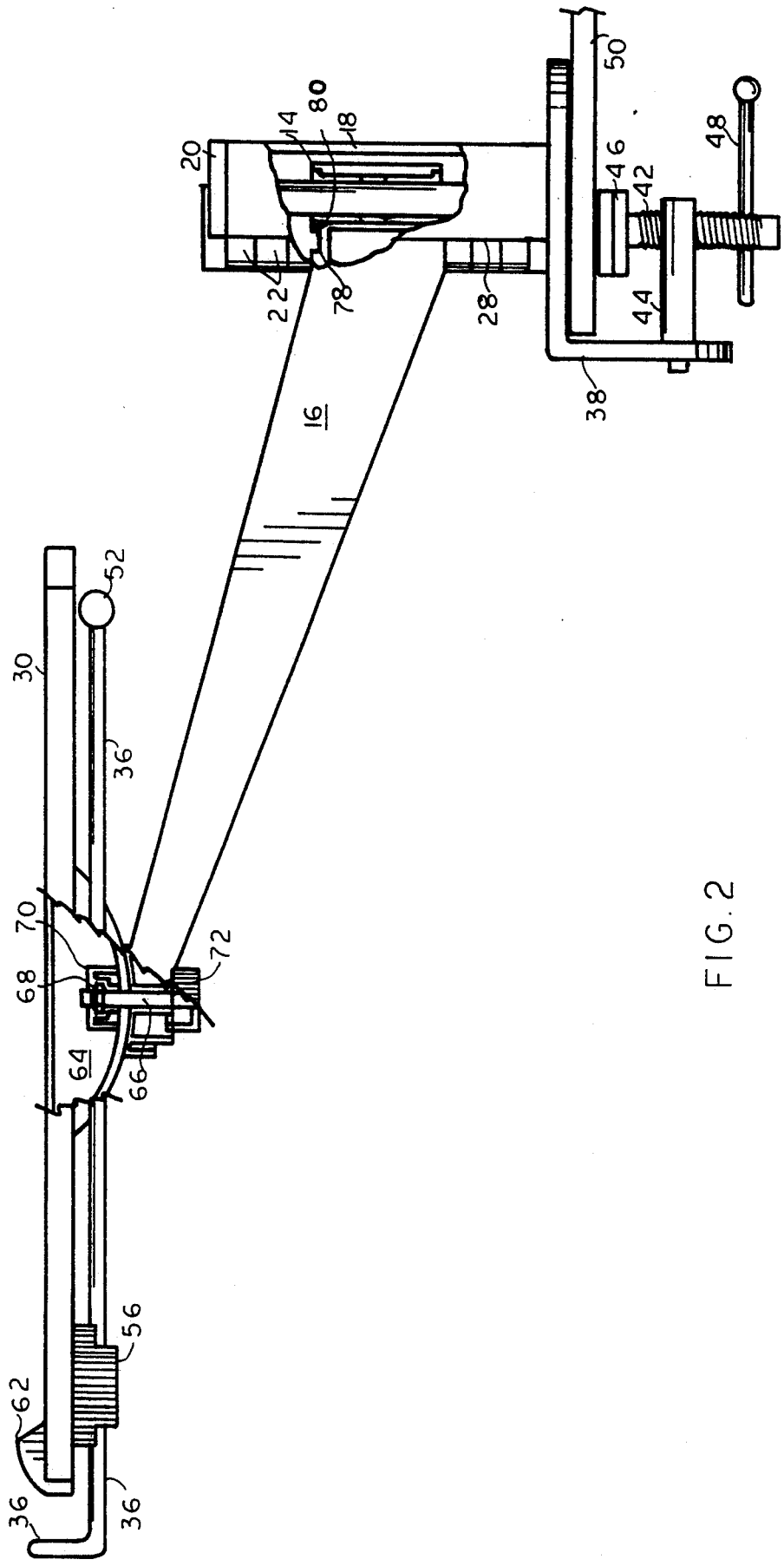
FIG. 2 is a side plan view with a portion in section of the apparatus of FIG. 1.
Figure 3:
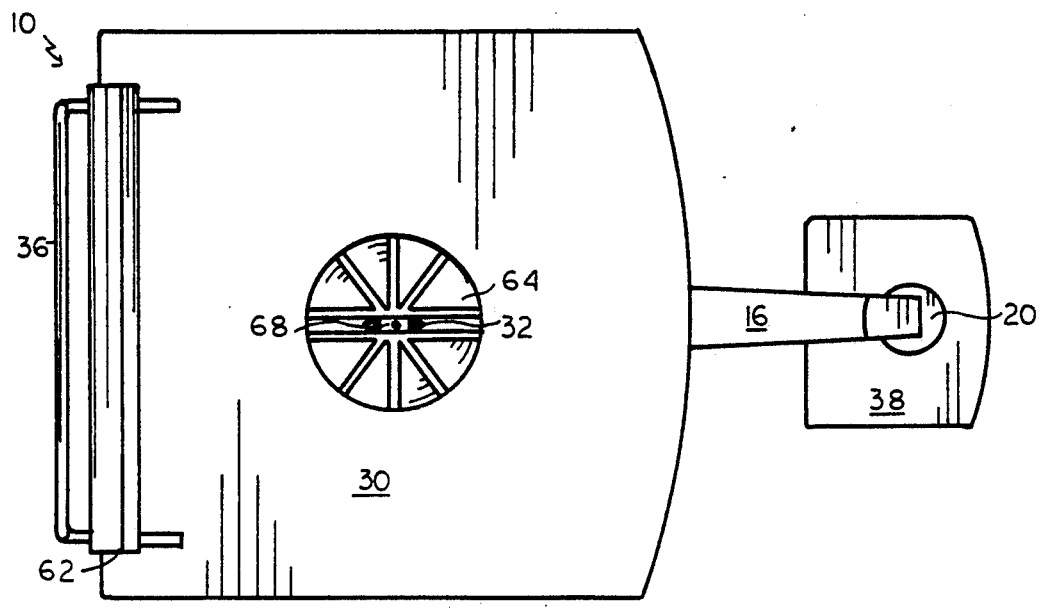
FIG. 3 is a top plan view of the apparatus of FIG. 1.
Figure 4:
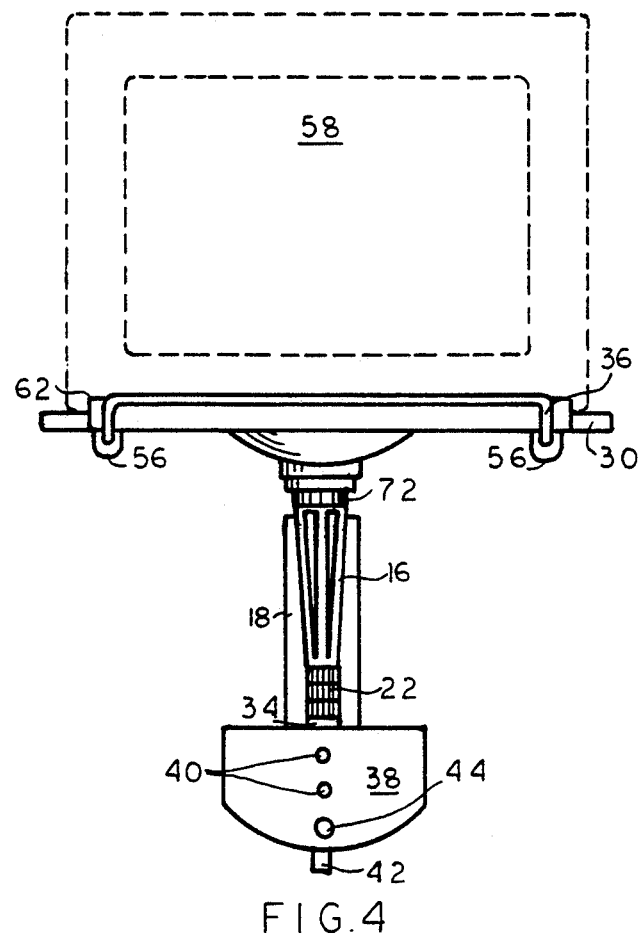
FIG. 4 is a front plan view of the apparatus of FIG. 1 with a supported monitor shown in dotted lines.
Figure 5:
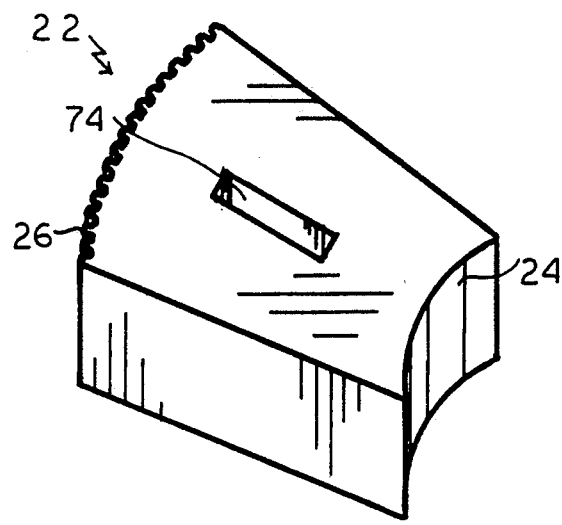
FIG. 5 is a perspective view of a spacer element of the apparatus of FIG. 2.
Figure 6:
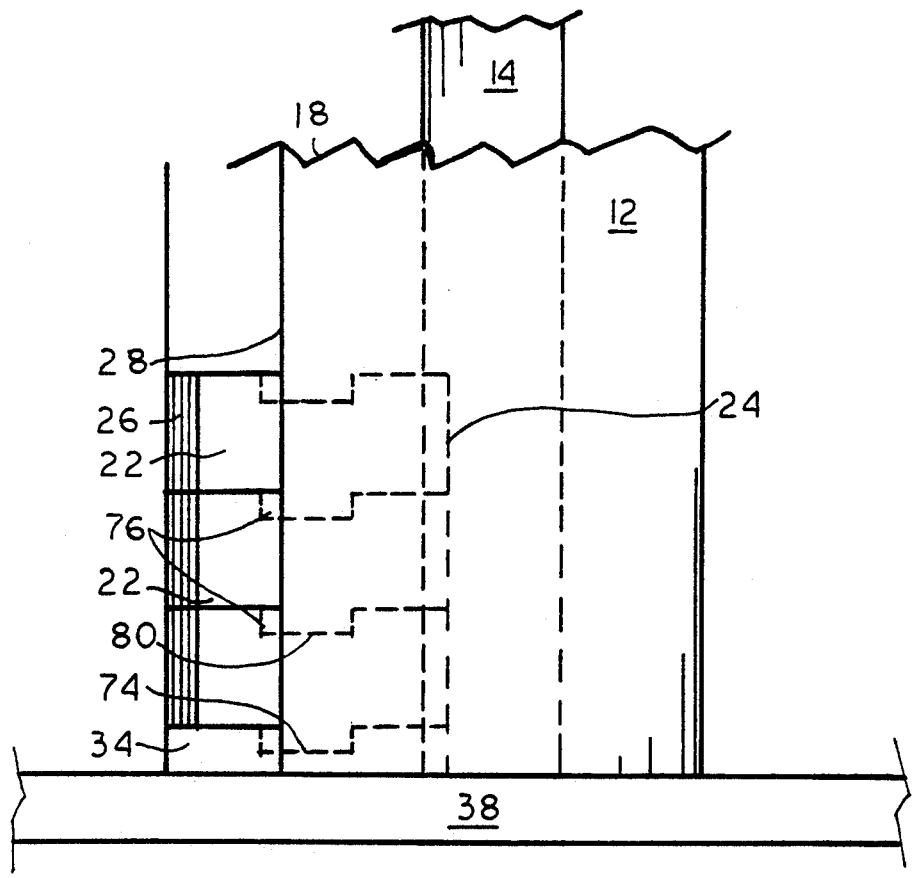
FIG. 6 is a side plan view of a plurality of spacer elements of FIG. 5 in a stacked position.

The spacer elements contain a raised elongated ridge 74 on the bottom surface which matingly fits within and engages an elongated slot 76 on the top surface of the next higher spacer element (see FIGS. 5 and 6). The interlocked, vertically stacked spacer elements are selected by the user to provide the desired height of the monitor arm 16 and to support the shaft bushing 14 to which the monitor arm 16 is secured for rotation thereabout.

The shaft 12 is secured to and extends upward from a right-angled metal bracket 38 having holes 40 on one side, to permit the bracket to be screwed or bolted to a surface. A clamp assembly is secured to the bracket 38 by clamp mount 44 with a threaded shaft 42 therethrough with a clamp cap 46 at the one end of the shaft 42 and a handle 48 for threadably turning the shaft 42 to force the clamp cap 46 into a clamping position such as on to a desk top 50.

The monitor support platform 30 has a peripheral lip and a short upward front tray extension 62 to aid in retaining the monitor on the platform 30 and the platform 30 is rotatably secured to the other end of the monitor arm 16 by a vertical threaded shaft 66, having a knurled adjusting knob 72 at the lower end beneath the support platform 30, and which shaft 66 extends through an elongated opening 32 in a circular depressed area 64 of the platform 30 to a captive nut 70 which extends beyond opening 32 and an angular locking nut 68. The platform includes a generally centrally positioned circular depression 64 about the elongated slot 32. Typically the support platform is formed of an injection-molded plastic material. In use, the knurled adjustable knob provides for the easy release or locking of the platform 30 which is free to rotate about shaft 66 in a generally horizontal plane, and also to be tilted slidably along the slot 32 to a desired tilted viewing position, and then by turning or tightening the knob 72 the platform 30 is locked in the supported tilted view position by the user.

The support platform 30 includes a keyboard support 36 which comprises a U-shaped wire support having a short upward front extension 54 to help retain the supported keyboard 60 in position. The wire frame keyboard support 36 is slidably mounted within a pair of spaced-apart friction-type supports 56 secured to the bottom surface of the support platform 30 to provide for the slidable movement by the user of the keyboard support 36 between a stored non-use position (see FIGS. 1-4) and a front, outwardly extending use position (Fig. 7).

In use, the apparatus 10 is secured to desk top 50 by clamp assembly (42, 44, 46 and 48). The vertical height of the monitor arm 16 is selected by the user arranging and positioning the spacer elements 22 in a vertically stacked manner within sleeve 18 with a greater height achieved if all of the spacer elements 22 are inserted under the shaft bushing 14.

To raise the monitor arm 16, the arrangement of the spacer element 22 is accomplished by removing cap 20 and then inserting and rearranging the spacer elements 22. The monitor arm 16 then may be rotated to a desired monitor viewing position, and the monitor support platform 30 rotated and tilted to a desired position and then locked in place by locking knob 72. Typically, the weight of the monitor 58 at the end of the monitor arm 16 on platform 30 is sufficient to retain the monitor arm 16 in the selected position. The keyboard support arm frame 36 may then be slidably extended to the use position and a keyboard 60 placed thereon.

The invention as described and illustrated provides for a simple, easily adjustable monitor support apparatus and method.

What is claimed is:

1. An adjustable monitor support apparatus for the support of a monitor having a monitor screen, which apparatus comprises:
   a) a generally vertical base means having a one and another end which comprises a generally vertical base shaft, rotatable shaft bushing about the shaft, and an outer sleeve about the shaft and shaft bushing;
   b) a generally horizontal, elongated angular monitor arm having a one end and another end, the one end of the monitor arm secured to the shaft bushing for rotation of the monitor arm about the base shaft;
   c) a monitor support platform adapted to support a monitor on the top surface of the monitor support platform, the other end of the monitor arm secured to a bottom of the monitor support platform;
   d) a means to provide for the axial rotation of the monitor support platform at the other end of the monitor arm in a generally horizontal plane;
   e) means to secure the monitor support platform in a selected locked position in a generally horizontal plane after rotation to the selected position;
   f) means to secure the one end of the base means to a surface above which surface a monitor is to be supported; and
   g) spacer means which comprises a plurality of spacer elements to permit the vertical adjustment of the height of the one end of the monitor arm on the shaft bushing by the selection of the arrangement of the spacer elements beneath the shaft bushing, thereby providing for the desired height of the monitor support platform at the other end of the monitor arm.

2. The apparatus of claim 1 which includes means to tilt slidably from the horizontal plane the monitor support platform to adjust the angular position of the monitor on the monitor support platform.

3. The apparatus of claim 2 wherein the means to tilt the monitor support platform includes an elongated slot generally centrally disposed in the monitor support platform, a shaft extending through the said slot, and a lock nut threadably connected to the said shaft, the monitor support platform slidable along the slot and fixed in position by the lock nut.

4. The apparatus of claim 1 wherein the monitor arm is comprised of a diecast aluminum metal.

5. The apparatus of claim 1 which includes a keyboard support means to support a keyboard in front of the monitor, which keyboard support is slidably mounted beneath the monitor support platform and moves between a stored non-use position beneath the monitor support platform and an outwardly-extending use position from the monitor support platform.

6. The apparatus of claim 5 wherein the keyboard support means comprises a generally U-shaped wire, slidably mounted beneath the monitor support platform and having a short, upwardly extending front to retain the keyboard in position and stop means to prevent the slidable withdrawal of the wire in use.

7. The apparatus of claim 1 wherein the means to secure the base means to a surface comprises a right angle mounting bracket and a threadable clamp assembly means on the bracket.

8. The apparatus of claim 1 wherein the means to provide for the axial rotation of the monitor support platform includes an upwardly extending threaded shaft at the other end of the monitor arm; the shaft having an upper and lower end extending through the monitor support platform and the means to secure the monitor arm in a selected locked position includes a threadable locking knob at the lower end of the shaft beneath the monitor support platform and a captive nut means at the upper end of the shaft whereby rotational movement of the locking knob locks or releases the monitor support platform in position.

9. The apparatus of claim 1 wherein the spacer means comprises a plurality of uniform height, individual, removable, spacer elements.

10. The apparatus of claim 9 wherein the sleeve has a vertical slot therein, the spacer elements are vertically stacked within the sleeve and extending outwardly from the said slot, with one end of the spacer elements adapted to be selectively positioned below or above the shaft to support the one end of the monitor arm at the desired height on the base means.

11. The apparatus of claim 10 wherein the one end of the spacer elements is arcuate to fit in a close mating manner to the diameter of the shaft.

12. The apparatus of claim 11 where the spacer elements are comprised of diecast aluminum metal.

13. The apparatus of claim 12 which includes a removable cap means which fits over the upper end of the sleeve and closes off the upper end of the sleeve and shaft.

14. The apparatus of claim 1 wherein the spacer elements have an arcuate end and have a spaced ridge on one surface and a mating groove on the other surface and the spacer elements are arranged in an interlocked vertically stacked arrangement within the sleeve and with the one arcuate against the shaft.

15. The apparatus of claim 1 wherein the spacer elements are vertically stacked in a removable interlocking relationship.

16. The apparatus of claim 1 wherein the monitor support platform includes a centrally positioned, generally circular, depressed area therein, which area includes an elongated slot and a slidable locking shaft means and locking knob to permit the monitor support platform to be tilted for the horizontal plane to adjust the position of the supported monitor.

17. In combination, the monitor support apparatus of claim 1 secured to a support surface and a monitor positioned on the monitor support platform.

18. An adaptable monitor support apparatus for the support and adjustable positioning of a monitor having a monitor screen, which apparatus comprises:
   a) a generally vertical base means having a one end and another end, which comprises a generally vertical shaft, a shaft bushing rotatable about the shaft, and an outer sleeve about the shaft and shaft bushing, the sleeve having an elongated vertical slot therein;
   b) a generally horizontal, elongated, slightly upwardly angular monitor arm of diecast aluminum having a one end and another end, the one end of the monitor arm secured to the shaft bushings for rotation of the monitor arm about the shaft;
   c) a monitor support platform adapted to support a monitor on the surface of the monitor support platform, the other end of the monitor arm secured to a bottom surface of the monitor support platform;
   d) means to provide for the axial rotation of the monitor support platform at the other end of the monitor arm in a generally horizontal plane, said means including a vertically extending shaft having an upper and lower end and centrally positioned through the monitor support platform;
   e) means to secure the monitor support platform in a selected locked position in a generally horizontal plane after rotation of the monitor arm to a selected position, said means including a threadably adjustable locking knob at the lower end of said shaft and below the other end of the monitor arm and monitor support platform and a captive nut means on the upper end of the said shaft, the locking knob adapted to provide a released or locked position for the monitor support platform;
   f) means to secure the one end of the base means to a surface above which surface a monitor is to be positioned, said means including a mounting bracket and a clamp assembly secured to the mounting bracket;
   g) spacer means which comprises a plurality of spacer elements within the sleeve to permit the vertical adjustment of the height of the one end of the monitor arm on the shaft bushing by the arrangement of the spacer elements within the sleeve and to provide for desired corresponding height of the monitor support platform at the other end of the monitor arm, said spacer means including a plurality of generally uniform width removable spacer elements, being a one and other end and arranged in a selected, aligned, vertically stacked, interlocked position within the said sleeve, one end being arcuate and selected to match the outer diameter of the shaft and to be placed adjacent the shaft and the other end extending outwardly in the said elongated slot of the said sleeve;
   h) means to tilt slidably the monitor support platform to adjust the angular position of the monitor on the monitor support platform; and
   i) a keyboard support means which includes a keyboard support means to support a keyboard in front of the monitor, which keyboard support is slidably mounted between the monitor support platform and moves between a stored, non-use position from the monitor support arm to an outwardly-extended use position.

19. An adjustable monitor support apparatus for the support of a monitor having a monitor screen, which apparatus comprises:
   a) a generally vertical base means having a one and another end which comprises a generally vertical base shaft, rotatable shaft bushing about the shaft, and an outer sleeve about the shaft and shaft bushing;
   b) a generally horizontal, elongated angular monitor arm having a one end and another end, the one end of the monitor arm secured to the shaft bushing for rotation of the monitor arm about the base shaft;
   c) a monitor support platform adapted to support a monitor on the top surface of the monitor support platform, the other end of the monitor arm secured to a bottom of the monitor support platform;
   d) a means to provide for the axial rotation of the monitor support platform at the other end of the monitor arm in a generally horizontal plane;

e) means to secure the monitor support platform in a selected locked position in a generally horizontal plane after rotation to the selected position;

f) means to secure the one end of the base means to a surface above which surface a monitor is to be supported;

g) means to position the monitor arm at a selected height on the base means to provide for a selective height of the monitor support platform; and h) the monitor support platform having a generally circular depressed area with an elongated slot centrally positioned in said area, and where the means to provide for the axial rotation of the monitor support platform extends through the elongated slot so as to permit the monitor support platform to tilt adjustably from the horizontal plane to position the monitor.

20. The apparatus of claim 18 where the means to position the monitor arm includes a plurality of generally uniform height, interlocked, removable, vertically stacked spacer elements positioned beneath the shaft bushing, the selection and arrangement of the spacer elements to adjust the height of the monitor support platform.

21. A method for the adjustable selection of the vertical height of a monitor support platform of a monitor support apparatus, which comprises a generally vertical base, a rotatable monitor support arm and having a one and other end generally horizontally extending at the one end from the base, and a monitor support platform at the other end of the base, which method comprises;

a) providing a plurality of spacer elements in a vertically stacked arrangement adjacent the shaft and beneath a slidable shaft bushing secured to the monitor arm and within a sleeve about the shaft; and b) arranging the positioning of the spacer elements above and below the shaft bushing to adjust vertically the support platform to a selected height.

22. The method of claim 21 which includes providing uniform height spacer elements with a concave arcuate surface at the one end directly adjacent the shaft and selectively positioning the spacer elements to adjust the height of the support platform at one end of the monitor arm.

23. The method of claim 21 which includes an angular tilting of the monitor support platform from a generally horizontal plane to adjust the viewing angle of the supported monitor.

24. The method of claim 21 which includes providing a keyboard support beneath the monitor support platform which slidably moves between a non-use stored position and an outwardly-extended use position.

25. The method of claim 21 which includes vertically adjusting the height of the one end of the rotatable monitor arm about a shaft by interlocking a plurality of uniform height, removable, individual spacer elements to a desired stacked, interlocked height, adjacent the outer diameter of the shaft.

* * * * *

UNITED STATES PATENT AND TRADEMARK OFFICE
CERTIFICATE OF CORRECTION

PATENT NO. : 5,277,392
DATED : January 11, 1994
INVENTOR(S) : Jon Rossman et al

It is certified that error appears in the above-identified patent and that said Letters Patent is hereby corrected as shown below:

```
In the claims, column 9, line 19, delete "18" and
insert --19--.
```

Signed and Sealed this

Seventh Day of June, 1994

Attest:

BRUCE LEHMAN

*Attesting Officer*        *Commissioner of Patents and Trademarks*